United States Patent [19]
Firey

[11] Patent Number: 5,216,982
[45] Date of Patent: * Jun. 8, 1993

[54] PRODUCT GAS RESERVOIRS FOR CYCLIC CHAR BURNING ENGINES AND GASIFIERS

[76] Inventor: Joseph C. Firey, P.O. Box 15514, Seattle, Wash. 98115-0514

[*] Notice: The portion of the term of this patent subsequent to May 5, 2009 has been disclaimed.

[21] Appl. No.: 876,303

[22] Filed: Apr. 30, 1992

[51] Int. Cl.⁵ .............................................. F02B 45/02
[52] U.S. Cl. .................................................... 123/23
[58] Field of Search ................ 123/23, 1 R, 3; 60/12, 60/39, 464

[56] References Cited

U.S. PATENT DOCUMENTS 5,027,752  7/1991  Firey ..................................... 123/23
5,109,808  5/1992  Firey ..................................... 123/23

Primary Examiner—Noah P. Kamen

[57] ABSTRACT

Reacted gas reservoirs are added to primary reactors of cyclic char burning engines and gasifiers within which product gas, created by reaction in the primary reactor, is stored during compression. An increased quantity of reactant gas can thus be passed through the reaction zone, and react therein to reacted gas, during each cycle of compression and expansion. The extent of primary reaction per cycle can be increased by this use of these product reacted gas reservoirs.

16 Claims, 5 Drawing Sheets

PRODUCT GAS RESERVOIRS FOR CYCLIC CHAR BURNING ENGINES AND GASIFIERS

Cross Reference to Related Applications

This invention is related to my following U.S. Patent applications:

(1) Improved Starting Means for Char Burning Engines, U.S. Pat. No. 5085183, Feb. 4, 1992.

(2) Two or More Flow Passages with Different Connection Places for Cyclic Solid with Gas Reactors, Ser. No. 07/666019, filed Mar. 7, 1991, now abandoned.

(3) Cross Flow Primary Reactors for Cyclic Char Burning Engines and Gasifiers, Ser. No. 07/725823, filed Jul. 3, 1991, now issued as U.S. Pat. No. 5,109,808.

(4) Cyclic Char Fuel Oxidation Reactors with Cross Flow Primary Reactors, Ser. No. 07/731208, filed Jul. 15, 1991, now standing allowed with issue fee paid.

(5) Opposed Cross Flow Primary Reactors for Cyclic Char Burning Engines and Gasifiers, Ser. No. 07/823479, filed Jan. 21, 1992, now standing allowed with issue fee paid.

(6) Cyclic Char Fuel Oxidation Reactors with Opposed Cross Flow Primary Reactor, Ser. No. 07/848545, filed Mar. 9, 1992, now standing allowed with issue fee paid.

BACKGROUND OF THE INVENTION

1. Field of the Invention

This invention is in the field of internal combustion engines and particularly the field of internal combustion engines burning solid fuels alone or in combination with liquid or gaseous fuels. The internal combustion engines can be of the piston and cylinder type or equivalent.

2. Description of the Prior Art

Prior art examples of char burning engines of the piston and cylinder type are described in the following U.S. Patents issued to applicant:

U.S. Pat. No. 4,372,256, Feb. 8, 1983
U.S. Pat. No. 4,412,511, Nov. 1, 1983
U.S. Pat. No. 4,698,069, Oct. 6, 1987
U.S. Pat. No. 4,794,729, Jan. 3, 1989.

In these example cyclic char burning engines and gasifiers air, or other reactant gas containing appreciable oxygen gas, is compressed into the pore spaces of a solid char fuel, contained within a separate primary reaction chamber, during a compression process and this is followed by expansion of the primary reacted gases, formed by reaction of oxygen with the char fuel, out of the pore spaces of the char fuel during an expansion process. This cycle of compression followed by expansion is repeated. This cycle of compression and expansion is created by a combined means for compressing and expanding, such as a piston operated within a cylinder, wherein the space enclosed by the piston crown and the cylinder walls is a variable volume chamber whose volume varies cyclically when the piston is reciprocated by an internal combustion engine mechanism for driving this combined means for compressing and expanding. Following each expansion process the reacted gases are largely removed from the variable volume chamber by an exhaust means. Fresh air is next supplied into the variable volume chamber by an intake means prior to the next following compression process. Thus an exhaust process followed by an intake process is interposed between each expansion process and the next compression process for a cyclic char burning engine or gasifier as is well known in the art of internal combustion engines. Each compression process occupies a compression time interval which is followed by an expansion process occupying an expansion time interval. The separate primary reaction chamber is contained within a pressure vessel container. A means for preheating the char fuel within the primary reaction chamber is used to bring the char fuel up to that temperature at which it will react rapidly with oxygen in adjacent compressed gases while the engine or gasifier is being started. Thereafter the means for preheating the char fuel can be turned off when the heat of the primary reaction becomes sufficient to keep the char fuel at or above this rapid reaction temperature. During starting a cranking means is used to drive the internal combustion engine mechanism. The detailed descriptions of cyclic char burning engines and gasifiers contained in the above listed U.S. Patents are incorporated herein by reference thereto.

The term char fuel is used herein and in the claims to include highly carbonaceous and largely solid fuels such as coal, coke, charcoal, petroleum coke, etc.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term producer gas is used herein and in the claims to mean those reacted gases emerging from the primary reactor during expansion and this is normally a fuel gas containing carbon monoxide and other components.

The term secondary reacted gas is used herein and in the claims to mean those reacted gases within the secondary reactor, and for engines these are normally essentially complete combustion products containing carbon dioxide and other components.

In engine applications of cyclic char burning engines and gasifiers the variable volume chamber is also a secondary reaction chamber comprising an igniter means for burning the primary reacted gases with secondary air during the expansion process. The needed secondary air is retained outside the char fuel primary reactor during compression. In gasifier applications of cyclic char burning engines and gasifiers no secondary air is thusly retained and thus the variable volume chamber is not a secondary reaction chamber. Hence for cyclic char burning gasifiers the final reacted gas during expansion is the producer gas product from the primary reactor. For both a cyclic char burning engine and a cyclic char burning gasifier net work output can be done on the piston, since both the primary and secondary reactions are exothermic and are carried out under varying pressures of the cycle. Herein and in the claims the term power reactor is used to mean either a cyclic char burning engine or a cyclic char burning gasifier.

The term fixed open gas flow connection is used herein and in the claims to mean a gas flow passage which remains open whenever the cyclic char burning engine or gasifier is operating.

The term changeable gas flow connection is used herein and in the claims to mean a gas flow passage which can be opened or closed while the cyclic char burning engine or gasifier is operating. A changeable gas flow connection is opened and closed by a means for opening and closing and this is driven from the internal combustion engine mechanism drive means as is well known in the art of internal combustion engines.

As the char fuel, within the primary reactor, moves along the char fuel motion direction it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

In prior art cyclic char burning engines and gasifiers the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no unburned char fuel, are removed. While such control means are feasible they are necessarily complex since it is difficult to sense the ash quantity and ash level existing within the ash collection zone. It would be desirable to have available an ash removal means which did not require such sensing of ash level within the primary reactor.

Within the space occupied by the chunks of char fuel two types of pore spaces exist. Within each char fuel chunk interior pore spaces exist in most char fuels. Between the char fuel chunks interstitial pore spaces exist.

In these prior art char burning engines the air quantity available for the primary reaction with char fuel is restricted to the air compressed into the interior and interstitial pore spaces of the hot char fuel in the rapid reaction zone during compression. It would be desirable to be able to increase the extent of char fuel reaction during each engine cycle and thus to increase the engine output.

SUMMARY OF THE INVENTION

Reservoirs are provided on a char burning engine which connect to the primary reaction chamber containing char fuel. During compression air flows from the variable volume chamber of the compressor and expander means into the primary reaction chamber and reacts therein with hot char fuel to form primary reacted gas. The primary reacted gas thusly formed flows on into the reservoir and remains there during compression.

In one first form of this invention the reservoir connects only to the primary reaction chamber. During expansion following compression primary reacted gas flows out of the reservoir and through the primary reaction chamber and into the variable volume chamber of the compressor and expander means for this first form of this invention. Thus the gas flow direction through the primary reactor during expansion is opposite to the gas flow direction during compression.

In another preferred form of this invention changeable gas flow connections are added which connect the variable volume chamber of the compressor and expander means only to the primary reaction chamber during compression and only to the reservoir during expansion. For this preferred form of this invention gas flows out of the reservoir and into the variable volume chamber of the compressor and expander means during expansion. Gas also flows during expansion from the primary reaction chamber into the reservoir and then into the variable volume chamber of the compressor and expander means for this preferred form of this invention.

For those forms of this invention using changeable gas flow connections, as described above, the gas flow direction through the primary reactor is the same during both compression and expansion. This flow direction is from the connection of the primary reactor to the variable volume chamber toward the connection of the primary reactor to the reservoir.

When the char fuel used contains volatile matter it will sometimes be preferred that gas flow through the primary reactor be from the refuel end toward the ash removal end. This gas flow direction can be secured in those forms of this invention using changeable gas flow connections by placing the connection from the variable volume chamber into the refuel end of the primary reactor and placing the connection to the reservoir into the ash removal end of the primary reactor. With this refuel to ash removal gas flow direction, tar formation is reduced since the volatile matter distilling out of freshly refueled coal from which tar is created is first mixed with air from the variable volume chamber before passing into the high temperature of the rapid reaction zone in the primary reaction chamber, and this is one of the beneficial objects of this invention.

When the char fuel is of low volatile matter as with coke it will sometimes be preferred that gas flow through the primary reactor be from the ash collection end toward the refuel end. This gas flow direction can be secured in those forms of this invention using changeable gas flow connections by placing the connection from the variable volume chamber into the ash removal end of the primary reactor and placing the connection to the reservoir into the refuel end of the primary reactor. With this ash removal to refuel gas flow direction ash particles are filtered out of the flowing gas by the larger char fuel particles and ash carryover is reduced, and this is another and different beneficial object of this invention.

With the reacted gas reservoirs of this invention a greater quantity of air passes through the rapid reaction zone of the primary reactor during compression than can be compressed into only the pore and interstitial volumes of the hot char fuel mass within the primary reactor. Substantially all of the oxygen gas within those air quantities which pass through the rapid reaction zone or are compressed into the pore and interstitial volumes within the rapid reaction zone will react with the carbon therein to form primary reacted gas much of which then flows on into the reservoir. By thusly increasing the air quantity which reacts with hot carbon, the use of the reservoirs of this invention increase the extent of the primary reaction during each engine cycle of compression and expansion. In this way engine torque and power output can be increased. The volume of the reacted gas reservoir can be made adjustable and in this way extent of primary reaction, engine torque, and engine power can be adjusted while the engine is running. This increase of available engine torque and adjustment thereof are among the beneficial objects of this invention.

The primary reacted gas reservoirs of this invention can also be arranged so that a mechanical separation of tar and ash particles from gas takes place in the reservoir. The thusly separated and collected tar and ash can then be periodically removed from the reservoir with an ash removal mechanism. When the tar and ash mixture is of reasonably low viscosity, as for example when kept at a moderately high temperature, the ash removal mechanism can be a simple valve. This mechanically simple ash removal mechanism is another beneficial object of this invention.

BRIEF DESCRIPTION OF THE DRAWINGS

One form of this invention is shown schematically in FIG. 1 and FIG. 2 as connected to a combined means for compressing and expanding gases.

A modified form of the reactors of this invention is shown in cross section in FIG. 3 wherein air enters the reactor at the ash collection end thereof.

Figure 4:
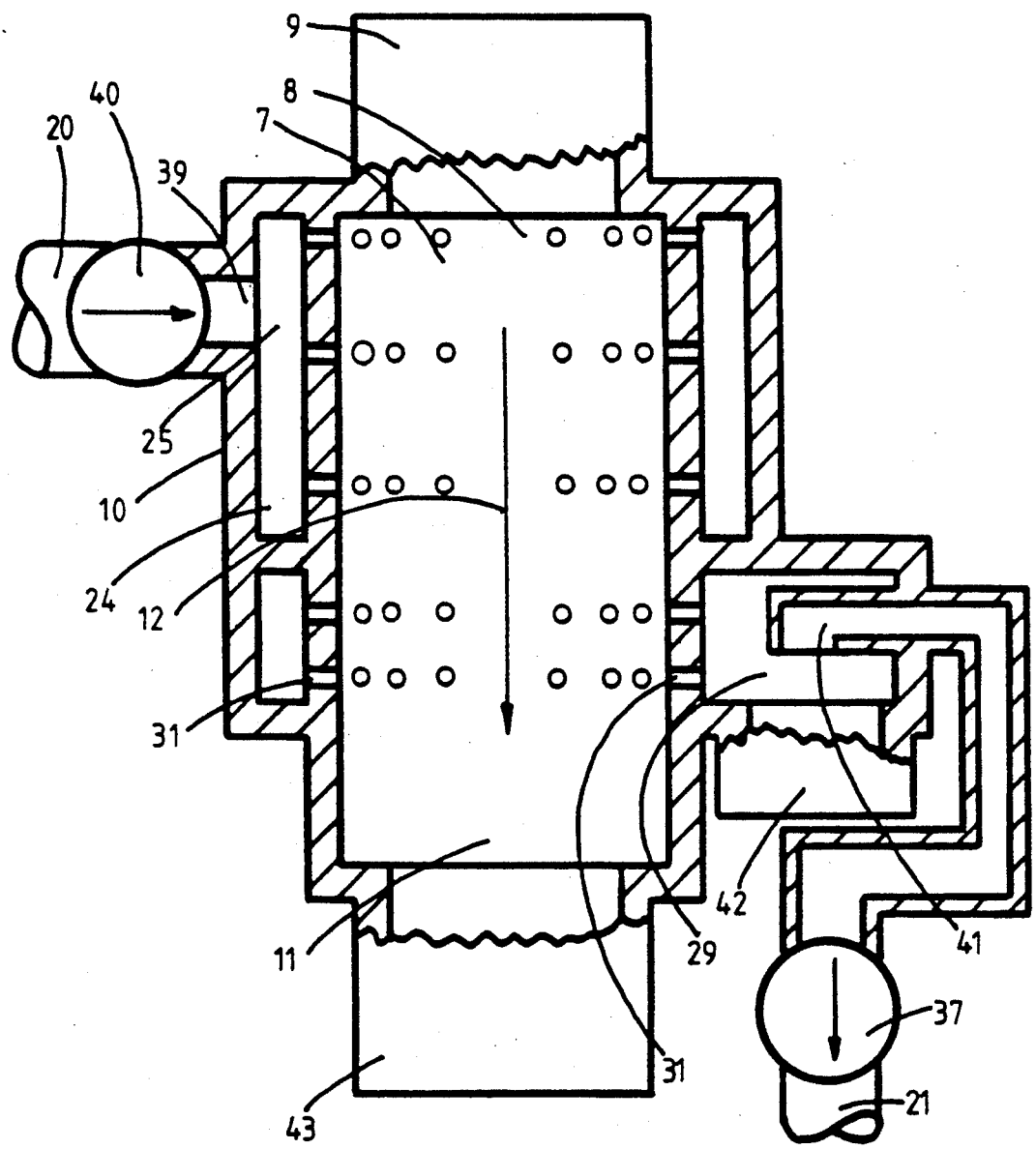

A unidirectional gas flow form of the reactors of this invention is shown in cross section in FIG. 4 wherein the gas flow direction during expansion is essentially the same as that during the preceding compression.

Figure 5:
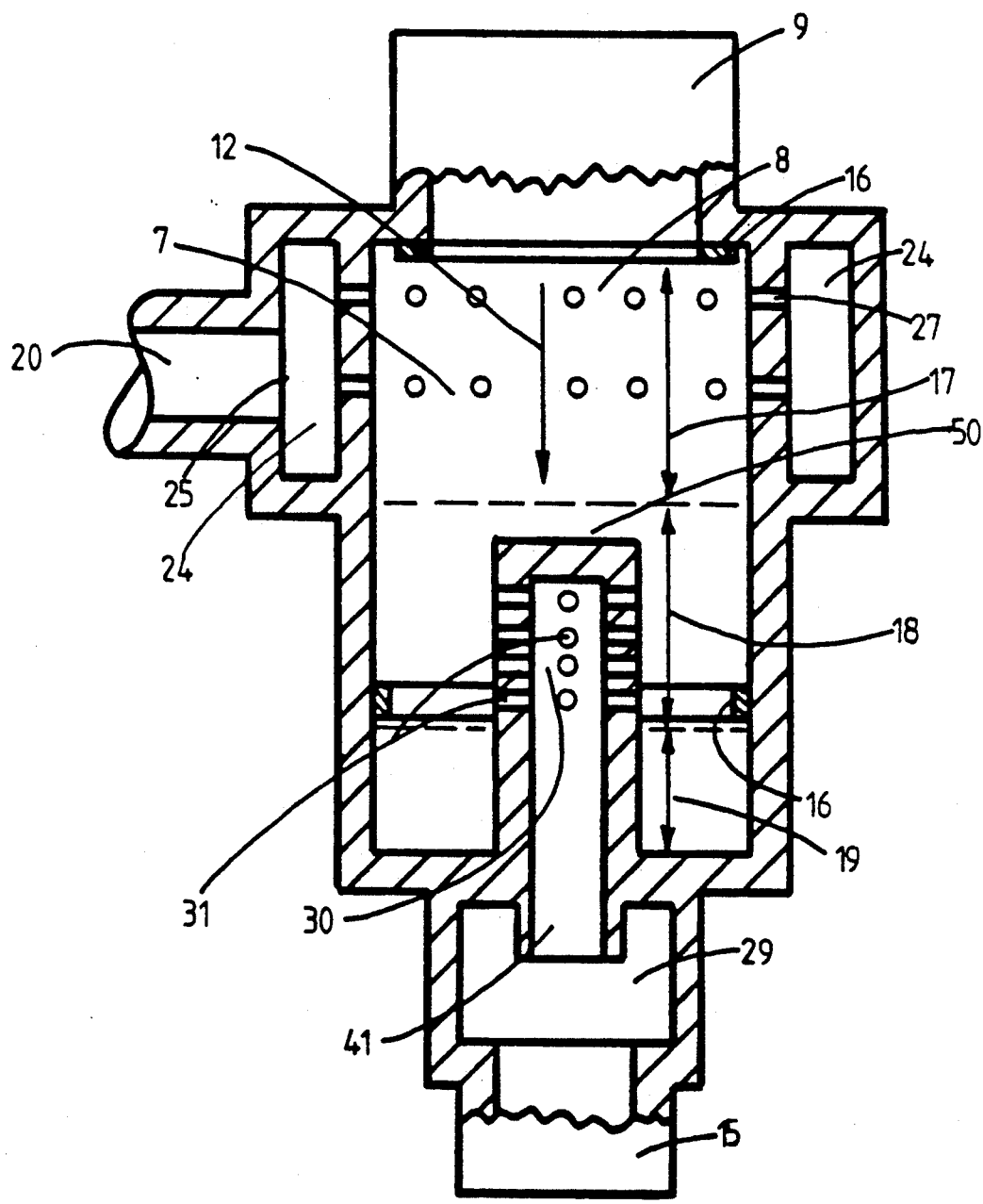

The reactor shown in cross section in FIG. 5 uses a central producer gas reservoir inlet.

DESCRIPTION OF THE PREFERRED EMBODIMENTS

Figure 1:
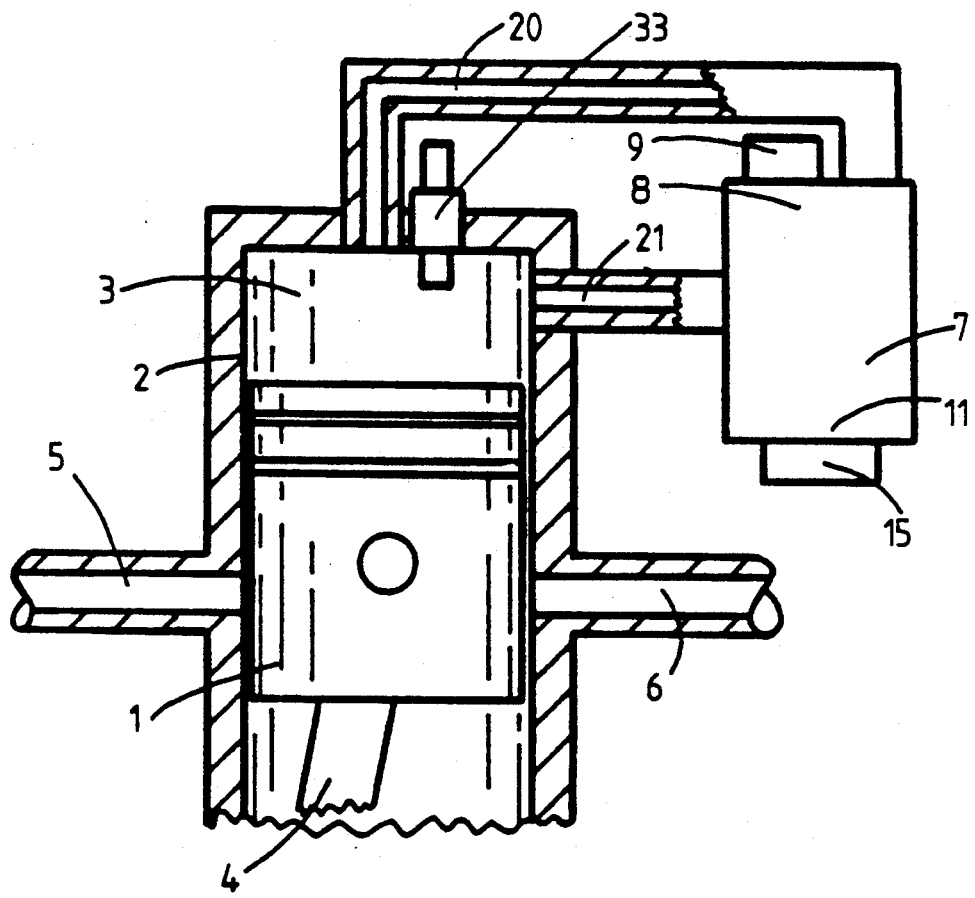
Figure 2:
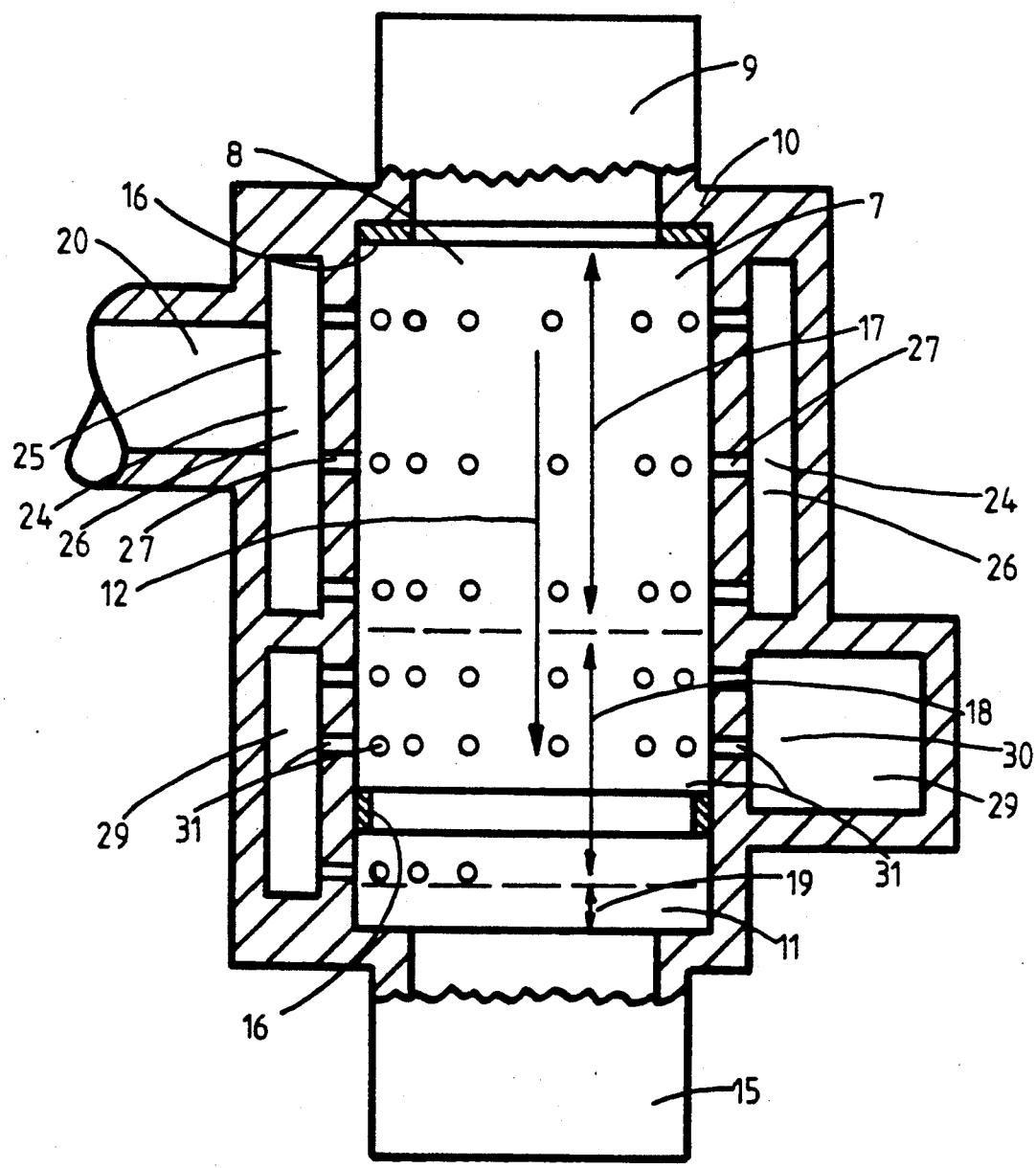

All forms of this invention are improvements to cyclic char burning engines or gasifiers using a separated primary reaction chamber, an example of which is shown schematically in FIG. 1 and 2, and comprises:

1. A combined means for compressing and expanding gases comprising: a piston, 1; operative within a cylinder, 2; and these enclosing a variable volume chamber, 3; whose volume varies cyclically as the piston is reciprocated by a drive means, 4, only the connecting rod of which is shown in FIG. 1. The drive means, 4, reciprocates the piston, 1, thus varying the volume of the variable volume chamber, 3, creating a compression process for a compression time interval when the piston, 1, is rising and decreasing the volume of the variable volume chamber 3, and creating an expansion process for an expansion time interval when the piston, 1, is descending and increasing the volume of the variable volume chamber, 3. The combined means for compressing and expanding shown in FIG. 1 further comprises: an intake means, 5, for placing air as reactant gas into the variable volume chamber, 3, prior to each compression process when the piston, 1, is at the bottom portion of its stroke; an exhaust means, 6, for removing reacted gases from the variable volume chamber, 3, after each expansion process when the piston, 1, is again at the bottom portion of its stroke. A two stroke cycle internal combustion engine mechanism is shown in FIG. 1 but four stroke cycle internal combustion engine mechanisms can also be used. Also drive means other than the crank and connecting rod mechanism of FIG. 1 can also be used such as the Wankel engine mechanism.

2. A separated primary reaction chamber, 7, contains char fuel which is added into the refuel end, 8, thereof by a refuel mechanism, 9, and this primary reactor comprises: a pressure vessel container, 10, to contain the primary reaction chamber, 7; an ash collection end, 11; a char fuel direction of motion, 12, from the refuel end, 8, toward the ash collection end, 11, in which direction the char fuel moves as it is being reacted and consumed within the primary reactor, 7; an ash removal mechanism, 15, which in this FIG. 1 and 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the engine is being cranked for starting, electrodes, 16, being used to pass a heating electric current directly through the char fuel itself in the example starring heater shown in FIG. 2.

3. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the preheat zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases to create a producer gas product, and the heat of this reaction maintains the rapid reaction zone at or above the char fuel rapid reaction temperature. Within the rapid reaction zone, 18, of the char fuel reactor, 7, the carbon of the char fuel is gasified to producer gas and leaves only the ashes which collect in the ash zone, 19, at the ash collection end, 11, of the char fuel motion path, 12.

4. Various means for connecting the primary reaction chamber, 7, to the variable volume chamber, 3, of the combined compressor and expander can be used for this invention. A single fixed open gas flow connection, 20, is shown in the particular example of FIG. 2, and thus gas flows from the variable volume chamber 3, via this connection, 20, into the primary reactor, 7, during compression, and this flow direction is reversed during expansion. Other connecting means may use additional separate connecting means, 21, between the primary reactor, 7, and the variable volume chamber, 3, as shown in FIG. 1, and as described hereinbelow.

The devices of this invention comprise additions to the separate primary reaction chamber, 7, of the cyclic char burning engines or gasifiers as described hereinabove as follows:

5. A reactant gas manifold, 24, is added whose inlet, 25, connects to the variable volume chamber, 3, of the combined compressor and expander via the connection, 20. The outlet, 26, of the reactant gas manifold, 24, connects to several ports, 27, into the primary reaction chamber, 7. These reactant gas ports, 27, are positioned along that portion of the length of the char fuel motion path, 12, through the primary reactor, 7, which is adjacent to the char fuel preheat zone, 17, and are positioned around most of the peripheral dimension of the primary reactor.

6. A producer gas reservoir, 29, is added whose inlet, 30, connects to several ports, 31, into the primary reaction chamber, 7. These producer gas ports, 31, are distributed along that portion, 18, of the char fuel motion path, 12, adjacent to the rapid reaction zone of the char fuel, and are positioned around most of the peripheral dimension of the primary reactor, 7.

7. The producer gas ports, 31, and also the reactant gas ports, 27, preferably have at least one area cross section dimension which is smaller than the char fuel particles being refueled into the primary reactor, 7. These ports can be of various shapes such as round holes or slots.

The operation of the particular example of this invention shown schematically in FIG. 1 and FIG. 2 is as follows:

1. when the cyclic char burning engine or gasifier of FIG. 1 is to be started, an electric current is passed through the char fuel in the primary reactor, 7, via the electrodes, 16, which heats up the char fuel to its rapid reaction temperature. The internal combustion engine mechanism drive means, 4, is then cranked by a cranking means for starting and cycles of compression followed by expansion are created within the variable volume chamber 3. Prior to each such compression air as reactant gas is placed inside the variable volume chamber, 3, by the intake means, 5. Following each such expansion reacted gas is removed from the variable volume chamber 3, by the exhaust means, 6.

2. During compression compressed air flows from the variable volume chamber, 3, via the fixed open gas flow connection, 20, into the reactant gas manifold, 24, and thence via the reactant gas ports, 27, into the primary reaction chamber,7. Within the rapid reaction zone, 18, air reacts rapidly with hot char fuel to form producer gas which flows via the producer gas ports, 31, into the producer gas reservoir, 29. Producer gas is thus stored during compression within the producer gas reservoir, 29, as well a within the pore spaces of the rapid reaction zone, 18.

3. During expansion producer gas flows out of the producer gas reservoir, 29, reaction zone, 18, into the reactant gas manifold, 24, via the reactant gas ports, 27, and into the variable volume chamber, 3, via the gas flow connecting means, 20. for this FIG. 1 and FIG. 2 form of the invention the gas flow direction during expansion is thus the reverse of the flow direction during compression.

4. Where the cyclic char burning unit is an engine, secondary air may be retained within the variable volume chamber 3, and mixed with the producer gas flowing thereinto during expansion to create a combustible mixture which can be ignited by a spark or other igniter means, 33.

Essentially complete combustion of the producer gas in air can thus be achieved by a secondary reaction within the variable volume chamber, 3, and work is produced by this engine cycle of compression, reaction, and expansion. In this engine case the variable volume chamber, 3, thus becomes also a secondary reaction chamber.

5. This cycle of intake, compression, reaction, expansion and exhaust is repeated. The starting heater means, 16, is turned off when the heat of the primary producer gas reaction within the primary reactor, 7, is sufficient to maintain the char fuel at its rapid reaction temperature within the rapid reaction zone, 18. The cranking means for starting is turned off when the net work of the cycle is sufficient to keep the engine running.

6. The total mass of primary air which is compressed into and through the primary reaction chamber is increased by the gas quantity which flows into the primary reacted gas reservoir. When at its rapid reaction temperature the char fuel will react with essentially all of the oxygen in both the air mass compressed into the pore and interstitial spaces of the hot char fuel and the air mass passing through the char fuel mass and onto the producer gas reservoir. In this way the extent of char fuel reaction, during each engine cycle of compression followed by expansion, is increased by use of the reservoirs of this invention. This is one of the beneficial objects of this invention.

Another form of this invention, similar to the form shown in FIG. 2, is shown in FIG. 5 wherein the inlet, 30, to the producer gas reservoir, 29, is positioned radially centrally within the ash collection zone, 19, and the rapid reaction zone, 18. The producer gas outlet ports, 31, are positioned along the length of the primary reaction chamber, 7, in the direction of char fuel motion, 12, which is adjacent to the rapid reaction zone, 18. These producer gas ports, 31, can be positioned angularly uniformly around the periphery of the inlet, 30, and are at right angles to the char fuel motion direction, 12, so that fuel particles will not tend to be pushed through these producer gas ports. With this centrally positioned inlet to the producer gas reservoir, 29, ash particles will carry over through the ports, 31, into the reservoir, 29, and the ash removal mechanism, 15, is thus positioned to remove ashes collected in the producer gas reservoir, 29. The top, 50, of the inlet, 30, to the producer gas reservoir, 29, is capped to prevent char fuel entering therein and thus bypassing the rapid reaction zone, 18.

Additional beneficial objects can be achieved by use of changeable gas flow connections between the primary reaction chamber and the variable volume chamber, in order to create a unidirectional flow, in whole or part, of the producer gas instead of the fully reversed flow of these gases which occurs in the FIG. 2 and FIG. 5 forms of this invention as described hereinabove. One particular example of a unidirectional flow form of this invention is shown schematically in FIG. 4 and FIG. 1 and comprises:

1. The following elements are similar to those described hereinabove for the FIG. 2 form of this invention:

The separate primary reaction chamber, 7, with refuel end, 8, refuel mechanism, 9, pressure vessel container, 10, ash collection end, 11, char fuel motion direction 12; gas flow connection, 20, to the variable volume chamber, 3; reactant gas manifold, 24, reactant gas ports, 27; producer gas reservoir, 29, producer gas ports, 31.

2. A first separate producer gas changeable gas flow connection, 21, connects the producer gas reservoir, 29, to the variable volume chamber, 3, and comprises a unidirectional flow means, 37, which creates flow only from the reservoir, 29, into the variable volume chamber, 3.

3. A second separate reactant gas changeable gas flow connection, 39, connects between the fixed open gas flow connection, 20, into the variable volume chamber, 3, and the inlet, 25, of the reactant gas manifold, 24, and comprises a unidirectional flow means, 40, which creates flow only from the variable volume chamber, 3, into the manifold, 24.

4. The changeable gas flow connections with unidirectional flow means, 37, 40, further comprise means for opening and closing the changeable gas flow connections.

5. A control means is added, operative upon the means for opening and closing the changeable gas flow connections, and driven by the internal combustion engine mechanism so that:
   a. The reactant gas changeable gas flow connection, 40, is open during most of all compression process time intervals, and is closed during most of all expansion time intervals;
   b. the producer gas changeable gas flow connection, 37, is closed during most of all compression process time intervals and is open during most of all expansion time intervals;

These changeable gas flow connections and drive means and control means thus function to create a unidirectional flow of gas from the variable volume chamber, 3, into the primary reactor, 7, and the producer gas reservoir, 29, via changeable gas flow connection, 40, during compression. During expansion unidirectional flow is continued from the primary reactor, 7, and the producer gas reservoir, 29, into the variable volume chamber, 3, via the separate changeable gas flow connection, 37.

The unidirectional flow means, 37, 40, of the changeable gas flow connections can be pressure actuated check valves wherein the pressure difference is the drive means and this pressure difference is controlled by the compression and expansion of the variable volume chamber, 3, driven by the internal combustion engine mechanism, 4. Alternatively mechanically driven valves can be used opened and closed by linkages from control cams driven by the internal combustion engine mechanism as is well known in the art of gas compressors and internal combustion engines.

For cyclic char burning engines we may prefer to direct the producer gas into the variable volume chamber, 3, moderately close to the igniter means, 33. During expansion the producer gas flows into the variable volume chamber and mixes with secondary air retained therein and this producer gas in secondary air mixture is then ignited by the igniter means, 33.

Where the cyclic char burning unit is an engine the producer gas product is to be mixed with the necessary secondary air so that complete combustion of the producer gas can be obtained during expansion in the secondary reactor of the variable volume chamber. This required secondary air can be simply stored in the variable volume chamber during compression and will be available then during expansion for the burning of the producer gas. Such use of the secondary reactor as also a secondary air reservoir, while mechanically simple, requires proper and prompt mixing of secondary air and producer gas during expansion. The required secondary air can alternatively be stored in whole or part in a reactant gas reservoir, such as are described in U.S. Pat. No. 4,794,729 and incorporated herein by reference, and the desired prompt and proper mixing of secondary air with producer gas during expansion can be more readily obtained with such separate reactant gas reservoirs.

Various types of igniter means, 33, can be used, such as electric sparks, glow plugs, burning gas air jets, diesel engine type injectors using highly compression ignitable fuels, etc. as is well known in the art of ignition of combustible fuel in air mixtures.

Wholly unidirectional gas flow is utilized in the form of this invention shown in FIG. 4. But partially unidirectional flow and partially reversed flow can be achieved by removing the unidirectional flow means, 40, from the reactant gas connecting means, 20, which then becomes a fixed open gas flow connection. During compression reactant gas flows, as before, into the primary reactor, 7, and producer gas reservoir, 29, only via the reactant gas manifold, 24, from the variable volume chamber, 3, the changeable gas flow connection, 37, being then closed. During expansion gas flows from the primary reactor, 7, and the producer gas reservoir, 29, in part via the now open changeable gas flow connection, 37, and in part via the reactant gas manifold, 24, and the fixed open gas flow connection, 20. This partially unidirectional flow and partially reversed flow form of this invention may be preferred when the cyclic char burning unit is a gasifier.

For prior art cyclic char burning engines and gasifiers ash removal mechanism, 43, means for removing ashes were used to remove ashes from the ash collection end, 11, of the primary reactor, 7, and this method can also be used for the present invention. Alternatively, or additionally, ashes can be carried over from the ash collection end, 11, into the producer gas reservoir, 29, and there separated from the gas and then removed from the producer gas reservoir. For this purpose the producer gas ports, 31, are made larger in cross section than the ash particles, a separator means, 41, for separating particles from the producer gas is placed in the producer gas reservoir, 29, and an ash removal mechanism, 42, is installed on the producer gas reservoir, 29, as shown schematically in FIG. 4. Various types of gas solid separators can be used as the separator means, 41, such as cyclone separators or other centrifugal force separators. It is simpler to remove ashes from the producer gas reservoir since whatever particles are collected there can be removed without fear of removing any reactable char fuel from the primary reaction chamber. The ash removal mechanism, 43, which removes ashes from the ash collection end, 11, of the primary reactor, 7, needs to be controlled so that only ashes and not char fuel are removed.

In the form of this invention shown in FIG. 1 and FIG. 2, air enters the primary reactor, 7, during compression, at the refuel end, 8. In other applications of cyclic char burning power reactors entry of air during compression may be preferred at the ash collection end, 11, of the primary reactor in order to obtain a more complete oxidation of the char fuel to ashes. Oxidation of the final portions of a char fuel tends to be obstructed by the relative increase of ash content resulting from prior char oxidation, and the final char oxidation may thus be slowed down. With char fuels of higher ash content appreciable char fuel portions may not be reacted due to this slowdown and efficiency is reduced thereby. Final char fuel oxidation can be promoted by use of the form of this invention shown in FIG. 3 and FIG. 1, wherein air enters the primary reactor, 7, at the ash collection end, 11, since maximum oxygen concentration is thus secured at the ash collection end to speed up the final oxidation of the char fuel occurring there. This FIG. 1 and FIG. 3 form of this invention is essentially similar to the FIG. 1 and FIG. 2 form of this invention as described hereinabove except as follows:

1. The reactant gas manifold, 51, inlet connects to the variable volume chamber, 3, of the combined compressor and expander via the connection, 52. The outlet, 53, of the reactant gas manifold, 51, connects to several ports, 55, into the primary reaction chamber, 7. These reactant gas ports, 55, are positioned along that portion of the length of the char fuel motion path, 12, through the primary reactor, 7, which is adjacent to the ash collection zone, 19, and the rapid reaction zone, 18, and are positioned around most of the peripheral dimension of the primary reactor.

2. The producer gas reservoir, 56, inlet, 57, connects to several ports, 58, into the primary reaction chamber, 7. These producer gas ports, 58, are positioned along that portion of the length of the char fuel motion path, 12, through the primary reactor, 7, which is adjacent to the char fuel preheat zone, 17, and are positioned around most of the peripheral dimension of the primary reactor.

Figure 3:
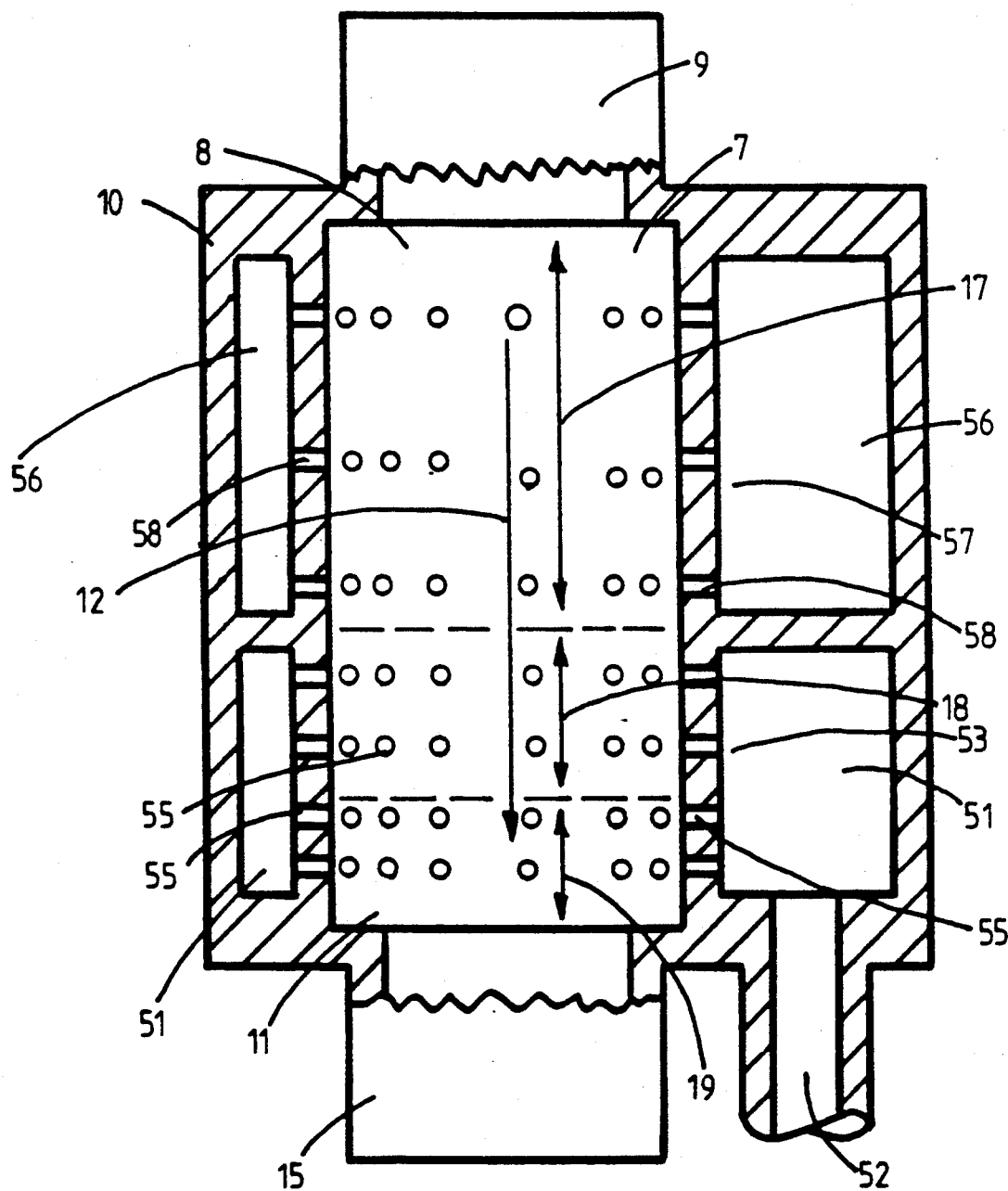

The operation of the particular example of this invention shown in FIG. 1 and FIG. 3 is essentially similar to the operation of the FIG. 1 and FIG. 2 form of this invention, as described hereinabove, except that, during compression, air enters the primary reactor, 7, at the ash collection end, 11, thereof instead of the refuel end. As shown in FIG. 3 and FIG. 1, the gas flow direction during expansion is the reverse of that during compression. However, use of air entry at the ash collection end of the primary reactor can also utilize unidirectional flow of gases or partially unidirectional and partially reversed flow of gases by incorporating changeable gas flow connections as described hereinabove.

Having thus described my invention what I claim is:

1. In a cyclic char burning power reactor comprising: at least one combined means for compressing and expanding gases, each said combined means comprising; an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding being connected to a separate primary reaction chamber, within a pressure vessel container, each said primary reaction chamber comprising; a refuel end with a refuel mechanism means for supplying fresh char fuel particles into said refuel end, an ash collection end, a char fuel direction of motion from said refuel end toward said ash removal end, each said primary reaction chamber further comprising, a char fuel preheat zone positioned toward said refuel end of said primary reaction chamber, an ash collection zone positioned toward said ash collection end of said primary reaction chamber, and a rapid reaction zone positioned between said char fuel preheat zone and said ash collection zone, each said primary reaction chamber further comprising at least one means for removing ashes; said char burning power reactor further comprising a source of supply of reactant gas containing appreciable oxygen gas to each said intake means for admitting reactant gases into said variable volume chamber; said char burning power reactor further comprising: means for preheating said char fuel within said primary reaction chamber to that temperature at which said char fuel reacts rapidly with oxygen in adjacent compressed reactant gases when said char burning power reactor is being started; means for cranking said internal combustion engine mechanism when said char burning power reactor is being started:

an improvement comprising adding to each said primary reaction chamber:
a reactant gas manifold comprising an inlet and an outlet, said outlet connecting to reactant gas inlet ports into said primary reaction chamber, and these ports positioned along that portion of the length of said primary reaction chamber in said direction of char fuel motion which is adjacent to said char fuel preheat zone;
a producer gas reservoir comprising an inlet, said inlet connecting to producer gas outlet ports out of said primary reaction chamber, and these ports positioned along that portion of said length of said primary reaction chamber along said direction of char fuel motion which is adjacent to said rapid reaction zone,
wherein all of said reactant gas inlet ports and also all of said outlet ports are smaller in at least one area cross section dimension than the char fuel particles to be refueled into said primary reaction chamber;
means for gas flow connecting said variable volume chamber of said internal combustion engine mechanism to said primary reaction chamber so that; during all compression time intervals gas flows from said variable volume chamber into said primary reaction chamber via said reactant gas manifold inlet and gas flows from said primary reaction chamber into said producer gas reservoir; and further so that during all expansion time intervals gas flows from said producer gas reservoir and said primary reaction chamber into said variable volume chamber.

2. In a cyclic char burning power reactor as described in claim 1:
wherein said means for gas flow connecting said variable volume chamber to said primary reaction chamber comprises a fixed open gas flow connection from said variable volume chamber to said inlet of said reactant gas manifold.

3. In a cyclic char burning power reactor as described in claim 2:
wherein said inlet of said producer gas reservoir is positioned approximately radially central within said ash collection zone and said rapid reactions zone;
wherein said producer gas outlet ports are positioned, along the length of said primary reaction chamber, in said direction of char fuel motion, which is adjacent to said rapid reaction zone, and approximately angularly uniformly around the periphery of said producer gas reservoir inlet at right angles to said char fuel motion direction.

4. In a cyclic char burning power reactor as described in claim 1:
wherein said producer gas reservoir further comprises an outlet separate from said inlet;
wherein said means for gas flow connecting said variable volume chamber to said primary reaction chamber comprises;
a reactant changeable gas flow connection between said variable volume chamber and said inlet of said reactant gas manifold and comprising means for opening and closing said reactant changeable gas flow connection;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber.

5. In a cyclic char burning reactor as described in claim 4:

wherein said inlet of said producer gas reservoir is positioned approximately radially central within said ash collection zone and said rapid reaction zone;

wherein said producer gas outlet ports are positioned, along the length of said primary reaction chamber, in said direction of char fuel motion, which is adjacent to said rapid reaction zone, and approximately angularly uniformly around the periphery of said producer gas reservoir inlet at right angles to said char fuel motion direction.

6. In a cyclic char burning power reactor as described in claim 4 wherein:

each said variable volume chamber of said internal combustion engine mechanism comprises a secondary reaction chamber and an igniter means for igniting fuel gas in air mixtures;

said producer gas changeable gas flow connection connects into said variable volume chamber adjacent to said igniter means therein.

7. In a cyclic char burning power reactor as described in claim 1:

wherein said ash removal mechanism means for removing ashes comprises means for removing collected solid and liquid materials from at least said producer gas reservoir.

8. In a cyclic char burning engine as described in claim 1 wherein:

said producer gas reservoir further comprises means for separating solid and liquid particles from said producer gas;

said ash removal mechanism means for removing ashes comprises means for removing collected solid and liquid materials from at least said producer gas reservoir.

9. In a cyclic char burning power reactor as described in claim 1:

wherein each said variable volume chamber of said internal combustion engine mechanism comprises a secondary reaction chamber and an igniter means for igniting fuel gas in air mixtures.

10. In a cyclic char burning power reactor as described in claim 1:

wherein said producer gas reservoir further comprises an outlet separate from said inlet;

wherein said means for gas flow connecting said variable volume chamber to said primary reaction chamber comprises; a fixed open gas flow connection from said variable volume chamber to said inlet of said reactant gas manifold, and a separate producer gas changeable gas flow connection into said variable volume chamber of said internal combustion engine mechanism from said outlet of said producer gas reservoir and comprising means for opening an closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said separate producer gas changeable gas flow connection is closed during most of all compression process time intervals and is open during most of all expansion time intervals of said connected variable volume chamber.

11. In a cyclic char burning power reactor comprising: at least one combined means for compressing and expanding gases, each said combined means comprising; an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding being connected to a separate primary reaction chamber, within a pressure vessel container, each said primary reaction chamber comprising; a refuel end with a refuel mechanism means for supplying fresh char fuel particles into said refuel end, an ash collection end, a char fuel direction of motion from said refuel end toward said ash removal end, each said primary reaction chamber further comprising, a char fuel preheat zone positioned toward said refuel end of said primary reaction chamber, an ash collection zone positioned toward said ash collection end of said primary reaction chamber, and a rapid reaction zone positioned between said char fuel preheat zone and said ash collection zone, each said primary reaction chamber further comprising at least one means for removing ashes; said char burning power reactor further comprising a source of supply of reactant gas containing appreciable oxygen gas to each said intake means for admitting reactant gases into said variable volume chamber; said char burning power reactor further comprising: means for preheating said char fuel within said primary reaction chamber to that temperature at which said char fuel reacts rapidly with oxygen in adjacent compressed reactant gases when said char burning power reactor is being started; means for cranking said internal combustion engine mechanism when said char burning power reactor is being started:

an improvement comprising adding to each said primary reaction chamber:

a reactant gas manifold comprising an inlet and an outlet, said outlet connecting to reactant gas inlet ports into said primary reaction chamber, and these ports positioned along that portion of the length of said primary reaction chamber in said direction of char fuel motion which is adjacent to said rapid reaction zone and said ash collection zone;

a producer gas reservoir comprising an inlet, said inlet connecting to producer gas outlet ports out of said primary reaction chamber and these ports positioned along that portion of said length of said primary reaction chamber in said direction of char fuel motion which is adjacent to said char fuel preheat zone;

wherein all of said reactant gas inlet ports and also all of said outlet ports are smaller in at least one area cross section dimension than the char fuel particles being refueled into said primary reaction chamber;

means for gas flow connecting said variable volume chamber of said internal combustion engine mechanism to said primary reaction chamber so that; during all compression time intervals gas flows from said variable volume chamber into said primary reaction chamber via said reactant gas manifold inlet and gas flows from said primary reaction chamber into said producer gas reservoir; and further so that during all expansion time intervals gas flows from said producer gas reservoir and said primary reaction chamber into said variable volume chamber.

12. In a cyclic char burning power reactor as described in claim 11:

wherein said means for gas flow connecting said variable volume chamber to said primary reaction chamber comprises a fixed open gas flow connection from said variable volume chamber to said inlet of said reactant gas manifold.

13. In a cyclic char burning power reactor as described in claim 11:

wherein said producer gas reservoir further comprises an outlet separate from said inlet;

wherein said means for gas flow connecting said variable volume chamber to said primary reaction chamber comprises;

a reactant changeable gas flow connection between said variable volume chamber and said inlet of said reactant gas manifold and comprising means for opening and closing said reactant changeable gas flow connection;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber.

14. In a cyclic char burning power reactor as described in claim 13 wherein:

each said variable volume chamber of said internal combustion engine mechanism comprises a secondary reaction chamber and an igniter means for igniting fuel gas in air mixtures;

said producer gas changeable gas flow connection connects into said variable volume chamber adjacent to said igniter means therein.

15. In a cyclic char burning power reactor as described in claim 11:

wherein said producer gas reservoir further comprises an outlet separate from said inlet;

wherein said means for gas flow connecting said variable volume chamber to said primary reaction chamber comprises; a fixed open gas flow connection from said variable volume chamber to said inlet of said reactant gas manifold, and a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said separate producer gas changeable gas flow connection is closed during most of all compression process time intervals and is open during most of all expansion time intervals of said connected variable volume chamber.

16. In a cyclic char burning power reactor as described in claim 11:

wherein each said variable volume chamber of said internal combustion engine mechanism comprises a secondary reaction chamber and an igniter means for igniting fuel gas in air mixtures.

* * * * *